(12) United States Patent
Ameri

(10) Patent No.: US 11,204,268 B2
(45) Date of Patent: Dec. 21, 2021

(54) MAGNETIC FLOWMETER HAVING A PROGRAMMABLE BI-DIRECTIONAL CURRENT GENERATOR

(71) Applicant: Micro Motion, Inc., Boulder, CO (US)

(72) Inventor: Masoud Ameri, Maple Plain, MN (US)

(73) Assignee: MICRO MOTION, INC., Boulder, CO (US)

( * ) Notice: Subject to any disclaimer, the term of this patent is extended or adjusted under 35 U.S.C. 154(b) by 179 days.

(21) Appl. No.: 16/588,012

(22) Filed: Sep. 30, 2019

(65) Prior Publication Data
US 2021/0072054 A1 Mar. 11, 2021

Related U.S. Application Data

(60) Provisional application No. 62/896,115, filed on Sep. 5, 2019.

(51) Int. Cl.
*G01F 1/60* (2006.01)
*G01F 1/58* (2006.01)

(52) U.S. Cl.
CPC ............... *G01F 1/60* (2013.01); *G01F 1/586* (2013.01); *G01F 1/584* (2013.01)

(58) Field of Classification Search
None
See application file for complete search history.

(56) References Cited

U.S. PATENT DOCUMENTS

| | | | |
|---|---|---|---|
| 4,167,871 A * | 9/1979 | Shauger | G01F 1/60 73/861.16 |
| 4,193,298 A | 3/1980 | Kayama et al. | |
| 4,229,703 A | 10/1980 | Bustin | |
| 4,784,000 A | 11/1988 | Gaertner | |

(Continued)

FOREIGN PATENT DOCUMENTS

| | | |
|---|---|---|
| CA | 2 306 666 | 3/1991 |
| CN | 1170125 | 10/2004 |

(Continued)

OTHER PUBLICATIONS

Office Action from Chinese Patent Application No. 202020151175.3, dated Jul. 7, 2020.

(Continued)

*Primary Examiner* — Harshad R Patel
(74) *Attorney, Agent, or Firm* — Westman, Champlin & Koehler, P.A.

(57) ABSTRACT

A magnetic flowmeter includes a flow tube assembly and a programmable bi-directional current generator. The flow tube assembly receives the fluid flow and includes a coil and an electromotive force (EMF) sensor. The coil is configured to produce a magnetic field across the fluid flow in response to a coil current. The EMF sensor is arranged to sense an EMF across the fluid flow that is proportional to the flow rate, and generate an output indicating the induced EMF. The current generator includes a profile generator that issues profile commands, a power amplifier and a controller. The controller is configured to control the power amplifier to generate coil current pulses forming the coil current that travel through the coil in alternating directions. Each coil current pulse has a current profile that is based on a corresponding profile command.

26 Claims, 8 Drawing Sheets

(56) References Cited

U.S. PATENT DOCUMENTS

| | | | |
|---|---|---|---|
| 5,325,728 | A | 7/1994 | Zimmerman et al. |
| 5,372,045 | A | 12/1994 | Schulz et al. |
| 5,530,639 | A | 6/1996 | Schulz et al. |
| 5,639,970 | A | 6/1997 | Schulz |
| 5,874,818 | A | 2/1999 | Schuurman |
| 5,905,206 | A | 5/1999 | Herwig et al. |
| 6,269,701 | B1 | 8/2001 | Keech |
| 6,644,127 | B1 | 11/2003 | Matzen |
| 6,697,742 | B1 | 2/2004 | Franklin et al. |
| 6,763,729 | B1 | 7/2004 | Matzen |
| 7,688,057 | B2 | 3/2010 | Foss et al. |
| 7,779,702 | B2 | 8/2010 | Shanahan |
| 7,921,733 | B2 | 4/2011 | Foss et al. |
| 9,163,968 | B2 | 10/2015 | Foss et al. |
| 9,175,993 | B2 | 11/2015 | Hunter et al. |
| 9,182,258 | B2 | 11/2015 | Rovner |
| 9,228,869 | B2 | 1/2016 | Hunter et al. |
| 9,395,221 | B2 | 7/2016 | Foss et al. |
| 9,696,188 | B2 | 7/2017 | Rogers et al. |
| 9,952,075 | B2 | 4/2018 | Foss et al. |
| 10,075,246 | B2 | 9/2018 | Hunter et al. |
| 10,663,331 | B2 | 5/2020 | Foss et al. |
| 2006/0081067 | A1* | 4/2006 | Budmiger ............ G01F 25/0007 73/861.08 |
| 2010/0107776 | A1 | 5/2010 | Shanahan |
| 2013/0333484 | A1 | 12/2013 | Henry et al. |
| 2015/0082906 | A1 | 3/2015 | Foss et al. |
| 2015/0082909 | A1 | 3/2015 | Foss et al. |
| 2015/0177035 | A1 | 6/2015 | Rovner et al. |
| 2017/0115146 | A1 | 4/2017 | Shi |

FOREIGN PATENT DOCUMENTS

| | | |
|---|---|---|
| CN | 107478279 | 12/2017 |
| CN | 107560676 | 1/2018 |
| DE | 10 2004 046 238 | 3/2006 |
| EP | 1 260 797 | 11/2002 |
| EP | 2 167 922 | 4/2019 |
| FR | 2 521 289 | 8/1983 |
| GB | 2 348 964 | 4/2000 |
| JP | 3-122523 | 5/1991 |
| RU | 2 584 384 | 5/2016 |
| RU | 2 645 834 | 2/2018 |
| WO | WO 2009/008974 | 1/2009 |
| WO | WO 2009/154112 | 12/2009 |
| WO | WO 2018/215034 | 11/2018 |

OTHER PUBLICATIONS

International Search Report and Written Opinion of the International Searching Authority from International Application No. PCT/US2020/024656, dated Jul. 8, 2020.
International Search Report and Written Opinion of the International Searching Authority from International Application No. PCT/US2020/047775, dated Nov. 19, 2020.
International Search Report and Written Opinion of the International Searching Authority from International Application No. PCT/US2020/047432, dated Nov. 25, 2020.
International Search Report and Written Opinion of the International Searching Authority from International Application No. PCT/US2020/047609, dated Dec. 16, 2020.
Office Action from U.S. Appl. No. 16/587,615, dated May 5, 2021.
Office Action from U.S. Appl. No. 16/587,886, dated May 14, 2021.

* cited by examiner

MAGNETIC FLOWMETER HAVING A PROGRAMMABLE BI-DIRECTIONAL CURRENT GENERATOR

CROSS-REFERENCE TO RELATED APPLICATION

The present application is based on and claims the benefit of U.S. provisional patent application No. 62/896,115, filed Sep. 5, 2019, the content of which is hereby incorporated by reference in its entirety.

FIELD

Embodiments of the present disclosure relate to magnetic flowmeters and, more specifically, to techniques for controlling a current profile used to generate a magnetic field during flow rate measurements.

BACKGROUND

Precise and accurate flow control is critical to a wide range of fluid processing applications, including bulk fluid handling, food and beverage preparation, chemistry and pharmaceuticals, water and air distribution, hydrocarbon extraction and processing, environmental control, and a range of manufacturing techniques utilizing thermoplastics, thin films, glues, resins and other fluid materials, for example. Flow rate measurement technologies used in each particular application depend upon the fluids involved, and on the relevant process pressures, temperatures and flow rates.

Exemplary flow rate measuring technologies include turbine devices that measure flow as a function of mechanical rotation, pitot sensors and differential pressure devices that measure flow as a function of the Bernoulli effect or pressure drop across a flow restriction, vortex and Coriolis devices that measure flow as a function of vibrational effects, and mass flowmeters that measure flow as a function of thermal conductivity. Magnetic flowmeters are distinguished from these technologies by characterizing a flow based on Faraday's Law, which depends upon electromagnetic interactions rather than mechanical or thermodynamic effects. In particular, magnetic flowmeters rely upon the conductivity of the process fluid, and the electromotive force (EMF) induced as the fluid flows through a region of magnetic field.

Conventional pulsed direct current (DC) magnetic flowmeters include a sensor section and a transmitter section. The transmitter section includes a current generator or coil driver that generates a coil current having a current magnitude that is set based on an operating setpoint of the magnetic flowmeter. Conventional coil drivers only create simple square pulsed current profiles of pre-determined magnitude by reversing current polarity into the coil. The coil current causes the coil to generate an alternating magnetic field across the fluid flow, which induces an EMF or potential difference (voltage) across the fluid flow that is proportional to the velocity of the flow and is detected by the sensor section. The magnetic flowmeter determines the flow rate of the fluid flow based on the sensed EMF.

During a reversal of the coil current, the current through the coil does not change instantaneously due to the inductance of the coil. This causes the coil current to initially overshoot the level specified by the operating setpoint, which in turn causes the magnetic field generated by the coil to settle at an incorrect field strength. As a result, accurate flow rate measurements are not possible until the coil current settles to a steady state level that matches the operating setpoint.

SUMMARY

Embodiments of the present disclosure are directed to magnetic flowmeters for measuring a flow rate of a fluid flow, and methods of measuring a flow rate of a fluid flow using a magnetic flowmeter. One embodiment of the magnetic flowmeter includes a flow tube assembly and a programmable bi-directional current generator. The flow tube assembly is configured to receive the fluid flow and includes a coil and an electromotive force (EMF) sensor. The coil is configured to produce a magnetic field across the fluid flow in response to a coil current. The magnetic field induces an EMF in the fluid flow that is proportional to the flow rate. The EMF sensor is arranged to sense the EMF and generate an output indicating the induced EMF. The current generator includes a profile generator configured to issue profile commands, a power amplifier and a controller. The controller is configured to control the power amplifier to generate coil current pulses forming the coil current that travel through the coil in alternating directions. Each coil current pulse has a current profile of voltage over time, such as the voltage across the coil, that is based on a corresponding profile command.

In one embodiment of the method, a fluid flow is received through a flow tube assembly having a coil. Profile commands are issued using a profile generator that defines a current profile of a voltage over time. Coil current pulses of a coil current are generated using a programmable bi-directional current generator. Each coil current pulse has a current profile of a voltage over time that is based on one of the profile commands. The coil current pulses are driven through the coil in alternating directions. A magnetic field is generated across the fluid flow using the coil. The magnetic field induces an electromotive force (EMF) in the fluid flow that is proportional to the flow rate in response to generating the coil current pulses. An output indicating the induced EMF is generated using an EMF sensor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
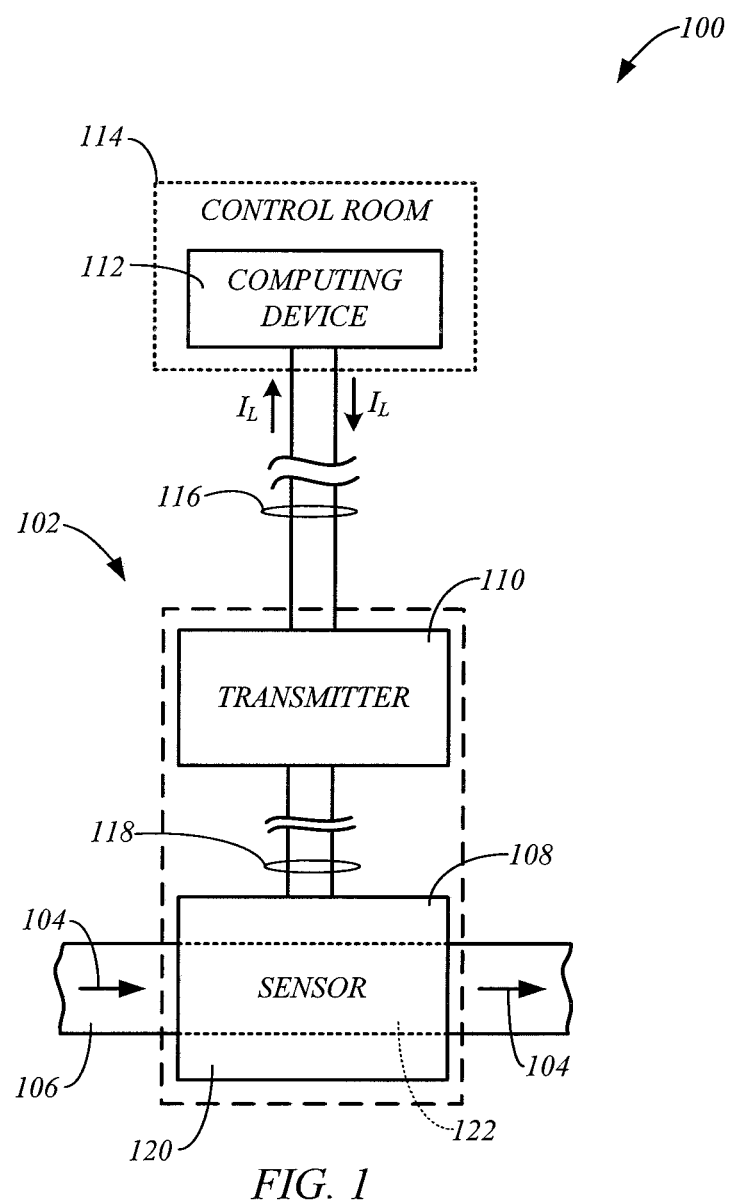
FIG. 1 is a simplified diagram of an exemplary industrial process measurement system, in accordance with embodiments of the present disclosure.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form, in order to avoid obscuring the embodiments in unnecessary detail.

FIG. 1 is a simplified diagram of an exemplary industrial process measurement system 100, in accordance with embodiments of the present disclosure. The system 100 may be used in the processing of a material (e.g., process medium) to transform the material from a less valuable state into more valuable and useful products, such as petroleum, chemicals, paper, food, etc. For example, the system 100 may be used in an oil refinery that performs industrial processes that can process crude oil into gasoline, fuel oil, and other petrochemicals.

The system 100 includes a pulsed direct current (DC) magnetic flowmeter 102 that is configured to sense a flow rate of a process fluid flow 104, such as through a pipe 106, for example. The magnetic flowmeter 102 includes an electromotive force (EMF) sensor section 108 and a transmitter 110. The transmitter 110 is generally configured to control the sensor section 108 to measure the flow rate of the fluid flow 104, and optionally communicate the measured flow rate to an external computing device 112, such as a computerized control unit, which may be remotely located from the flowmeter 102, such as in a control room 114 of the system 100, for example.

The transmitter 110 may communicate with the external computing device 112 over a suitable process control loop. In some embodiments, the process control loop includes a physical communication link, such as a two-wire control loop 116, or a wireless communication link. Communications between the external computing device 112, and the transmitter section may be performed over the control loop 116 in accordance with conventional analog and/or digital communication protocols. In some embodiments, the two-wire control loop 116 includes a 4-20 milliamp control loop, in which a process variable may be represented by a level of a loop current $I_L$ flowing through the two-wire control loop 116. Exemplary digital communication protocols include the modulation of digital signals onto the analog current level of the two-wire control loop 116, such as in accordance with the HART® communication standard. Other purely digital techniques may also be employed including Foundation Fieldbus and Profibus communication protocols. Exemplary wireless versions of the process control loop include, for example, a wireless mesh network protocol, such as WirelessHART® (IEC 62591) or ISA 100.11a (IEC 62734), or another wireless communication protocol, such as WiFi, LoRa, Sigfox, BLE, or any other suitable protocol.

Power may be supplied to the magnetic flowmeter 102 from any suitable power source. For example, the magnetic flowmeter 102 may be wholly powered by the loop current $I_L$ flowing through the control loop 116. One or more power supplies may be utilized to power the process magnetic flowmeter 102, such as an internal or an external battery. An electrical power generator (e.g., solar panel, a wind power generator, etc.) may also be used to power the magnetic flowmeter 102, or charge a power supply used by the magnetic flowmeter 102.

The transmitter 110 may be directly attached to the sensor section 108, such as to a housing containing the sensor section 108, or located remotely (e.g., 10-1000 feet) from the sensor 108. When the transmitter 110 is remotely located from the sensor section 108, electrical connections between the transmitter 110 and sensor section 108 may be provided by one or more connecting cables or transmission lines 118, which may be formed by cables, wires, a data bus, a control bus, or other suitable connection for electrical and data communication.

Figure 2:
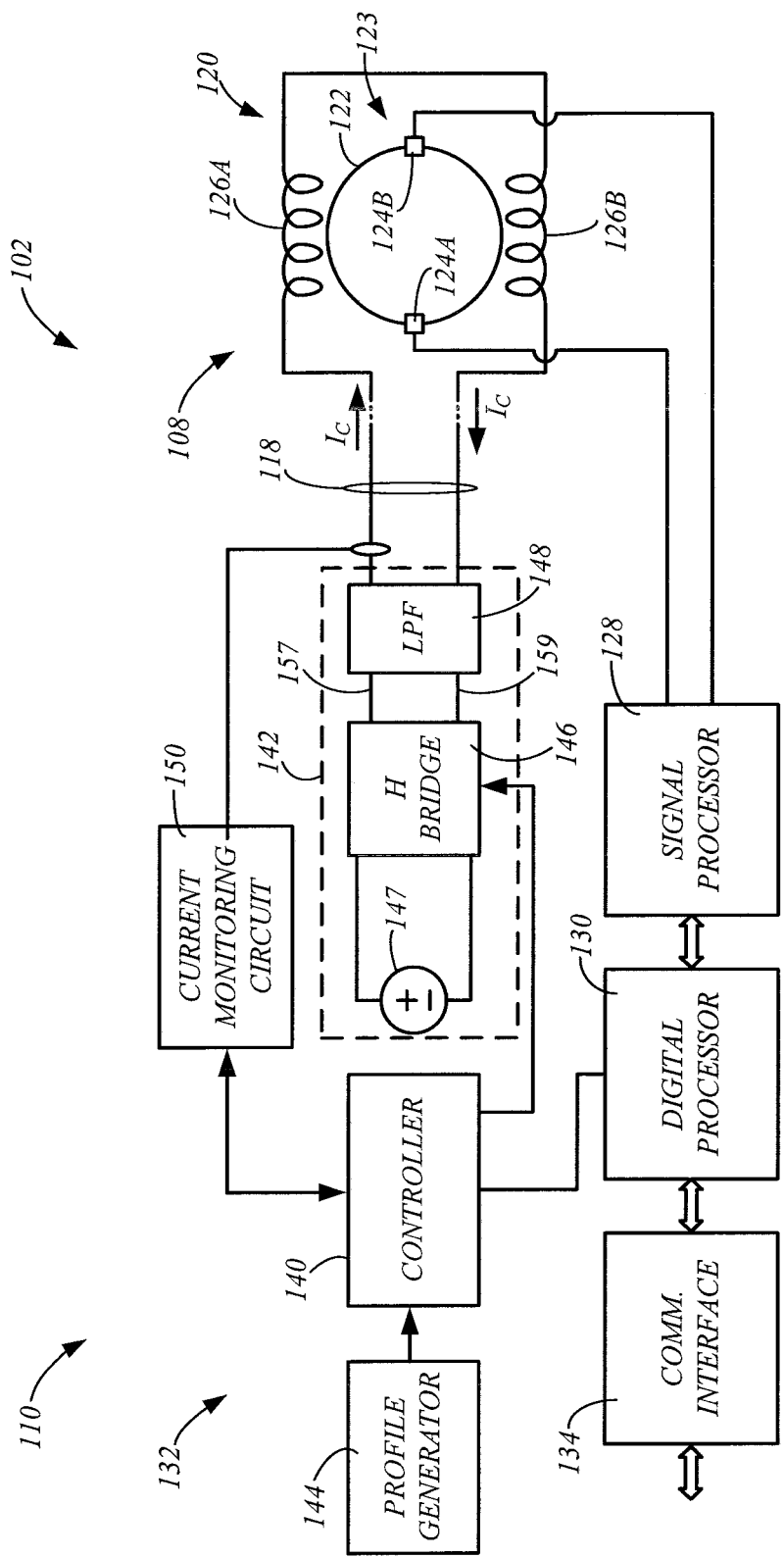
FIG. 2 is a simplified diagram of an exemplary magnetic flowmeter, in accordance with embodiments of the present disclosure.

FIG. 2 is a simplified diagram of the magnetic flowmeter 102, in accordance with embodiments of the present disclosure. The sensor section 108 may include a flow tube assembly 120 having a pipe section 122, through which the fluid flow 104 travels, as shown in FIG. 1. The flow tube assembly 120 also includes an EMF sensor 123 having electrodes 124, such as electrodes 124A and 124B, and the flow tube assembly 120 includes one or more field coils or coil wires 126, such as field coils 126A and 126B. The electrodes 124A and 124B, and the coils 126A and 126B may be positioned on opposing sides of the pipe section 122, as shown in FIG. 2.

The transmitter 110 may include, for example, a signal processor 128, a digital processor 130 and programmable bi-directional current generator 132. In some embodiments, the transmitter 110 includes a communication interface 134. The digital processor 130 may represent one or more processors that control components of the magnetic flowmeter 102 to perform one or more functions described herein in response to the execution of instructions, which may be stored in non-transitory, patent eligible memory. In some embodiments, the digital processor 130 provides control signals to the current generator 132 based on an operating setpoint of the magnetic flowmeter 102, and the current generator 132 produces a DC coil current $I_C$ that includes DC current pulses that are delivered through the one or more coils 126 in alternating directions.

The coil current $I_C$ is delivered through the field coils 126A and 126B of the flow tube 120 through a suitable electrical connection, such as the transmission line 118 shown in FIGS. 1 and 2. This causes the coils 126A and 126B to generate an alternating magnetic field across the fluid flow 104 traveling through the pipe section 122, which functions as a moving conductor that induces an EMF in the fluid in accordance with Faraday's law of electromagnetic induction. The electrodes 124A and 124B, which are either capacitively coupled to the conductive process fluid or in direct electrical contact with the process fluid, pick up the voltages present in the fluid flow 104. The difference in the voltages at the electrodes 124A and 124B is proportional to the rate of the fluid flow 104 and forms an output of the EMF sensor 123.

The signal processor 128 of the transmitter 110 is connected to the electrodes 124A and 124B to receive the output from the sensor 123 in the form of a differential voltage. The digital processor 130 controls the signal processor 128 to sample the voltage difference between the electrodes 124A and 124B, and provide the measured voltage difference to the digital processor 130, using any suitable technique. This may involve converting an analog differential voltage signal to a digital value that is supplied to the digital processor 130, for example. The digital processor 130 may perform additional signal processing of measured differential voltage to establish a measurement of the flow rate of the process fluid flow 104, which may be communicated to the computing device 112 using the communications interface 134.

In some embodiments, the current generator 132 includes a controller 140, a power amplifier 142, and a profile generator 144. The controller 140 may represent one or more processors that control components of the power amplifier 142 to perform one or more functions described herein, such as in response to control signals from the digital processor 130, profile commands 145 from the profile generator 144, and/or in response to the execution of instructions, which may be stored in non-transitory, patent eligible memory represented by the controller 140. For example, the controller 140 may control the power amplifier 142 to produce the coil current pulses that form the coil current $I_C$ based on signals from the digital processor 130, which may be based on the operating setpoint for the magnetic flowmeter 102, and control a current profile for each of the coil current pulses based on the profile commands 145 from the profile generator 144. As used herein, the "current profile" of the coil current $I_C$ or the coil current pulses corresponds to a voltage across or to one side of the coils 126 over time that corresponds to the coil current $I_C$ through the coils 126.

Figure 3:
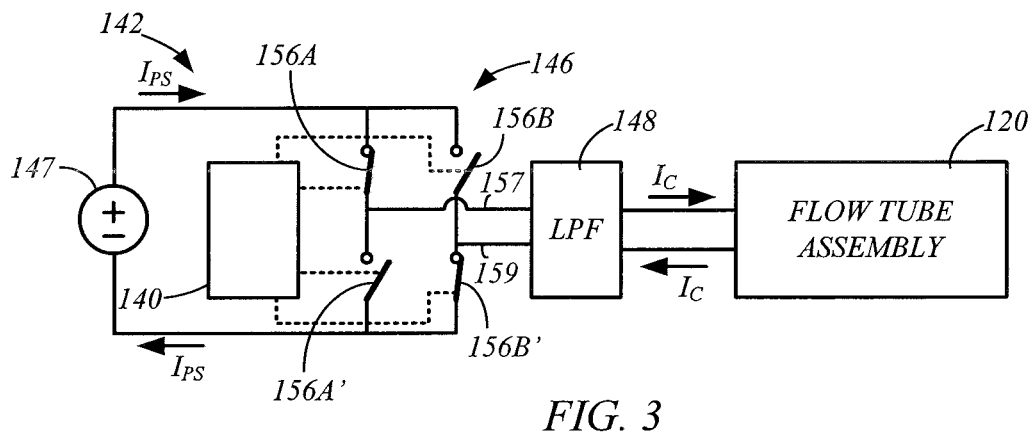
FIGS. 3 and 4 are simplified diagrams of an exemplary programmable bi-directional current generator, in accordance with embodiments of the present disclosure.
Figure 4:
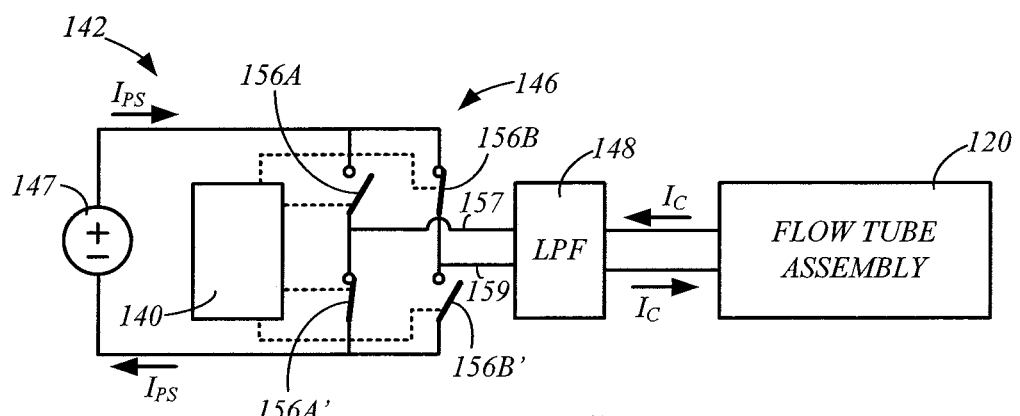

FIGS. 3 and 4 are simplified diagrams of an exemplary power amplifier 142, in accordance with embodiments of the present disclosure. The power amplifier 142 may be in the form of a voltage controlled current source, or another suitable current source. In the illustrated example, the power amplifier 142 includes a power supply 147, an H bridge 146 and a low pass filter (LPF) 148. The H bridge is configured to receive an unfiltered current $I_{PS}$ from the power supply 147 (e.g., voltage source) that travels in the direction indicated in FIGS. 3 and 4. In some embodiments, the H bridge 146 comprises pairs of complementary switches 156 including a switch 156A and its complementary switch 156A', and a switch 156B and its complementary switch 156B'. The complementary nature of the switch pairs 156A and 156A', means that when switch 156A is open, switch 156A' is closed, and when switch 156A is closed, switch 156A' is open. This also applies to the complementary switches 156B and 156B'.

The controller 140 may include a microprocessor and gate driver that controls the switch pairs 156A and 156A' and 156B and 156B' to generate high frequency (e.g., 10-100 kHz) unfiltered current pulses from the unfiltered current $I_{PS}$, which are delivered to the LPF 148 over conductors 157 or 159. The low pass filter (LPF) 148 operates to attenuate the high frequency unfiltered current pulses from the H bridge 146 output on conductors 157 or 159, to form the low frequency (e.g., 5-100 Hz) coil current pulses that form the coil current $I_C$.

Figure 5:
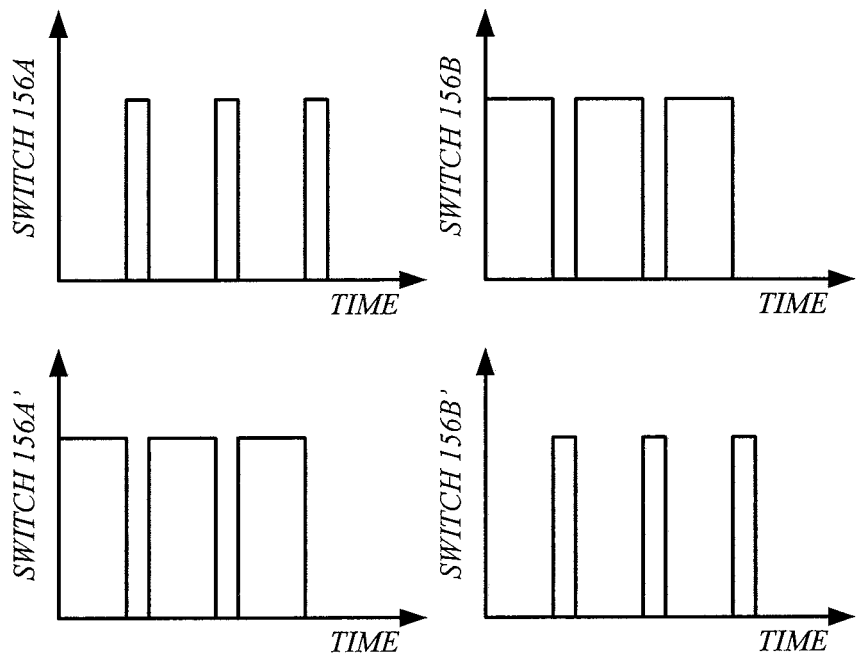
FIGS. 5 and 6 are charts illustrating exemplary control signals from a controller to pairs of complementary switches of an H bridge, in accordance with embodiments of the present disclosure.
Figure 6:
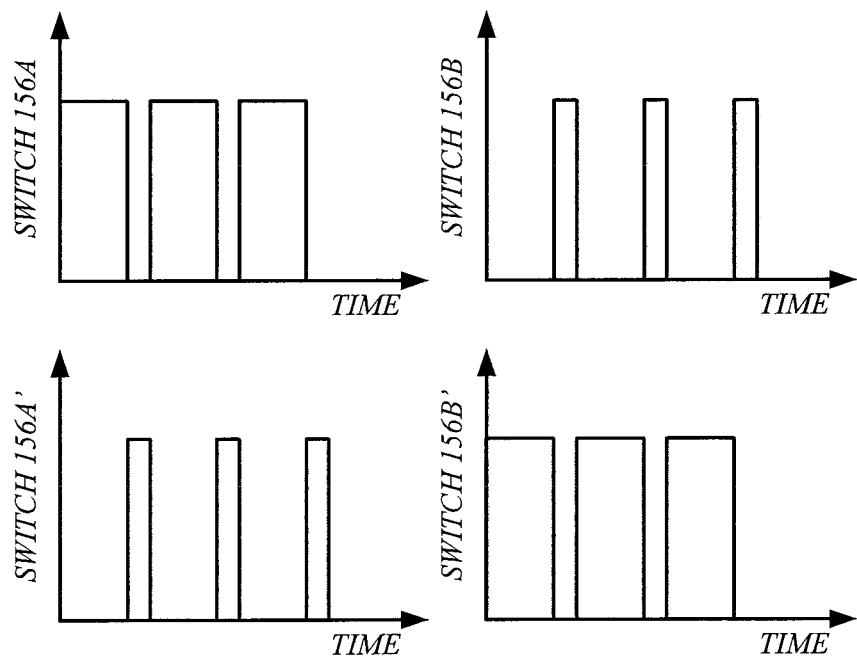

The controller 140 controls the direction the filtered coil current $I_C$ flows through the one or more coils 126 by modulating a duty cycle of the switches 156. For example, FIGS. 5 and 6 are charts illustrating exemplary control signals from the controller 140 to the switches 156 that cause the coil current $I_C$ to flow in the direction indicated in FIGS. 4 and 3, respectively. A high signal in the charts corresponds to a closed state for the switches 156, and a low signal in the charts corresponds to an open state. As indicated in FIG. 5, the duty cycle for the switch 156A is less than the duty cycle for the switch 156B. As a result, the duty cycle for the switch 156A' is greater than the duty cycle for the switch 156B'. This causes the average voltage in the line 159 to be greater than the average voltage in line 157, resulting in the coil current $I_C$ flowing in the direction indicated in FIG. 3. In FIG. 6, the duty cycle for the switch 156A is greater than the duty cycle for the switch 156B, and the duty cycle for the switch 156A' is less than the duty cycle for the switch 156B'. This causes the average voltage in the line 157 to be greater than the average voltage in line 159, resulting in the coil current $I_C$ flowing in the direction indicated in FIG. 4. This configuration is distinct from conventional power amplifiers of magnetic flowmeters 102 that use an H bridge to simply route a current from a power supply in alternating directions through coils of a flow tube assembly.

Figure 7A:
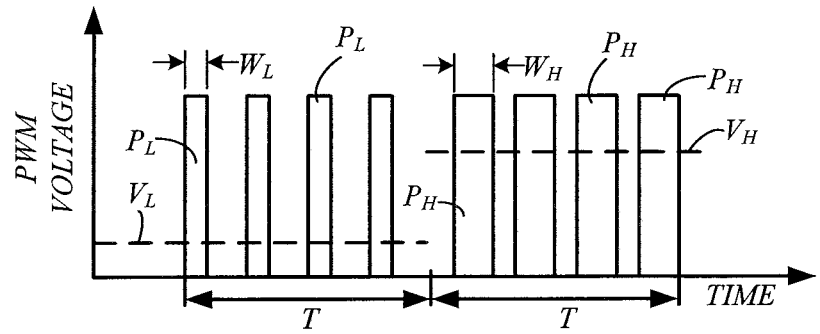
FIGS. 7A and 7B are voltage charts respectively illustrating exemplary high frequency unfiltered current pulses, and the corresponding coil current pulses, in accordance with embodiments of the present disclosure.
Figure 7B:
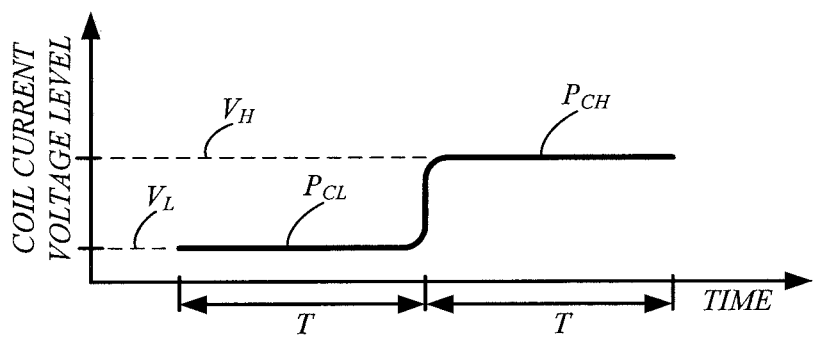

FIGS. 7A and 7B are voltage charts respectively illustrating exemplary high frequency unfiltered current pulses $P_L$ and $P_H$ output from the H bridge 146 at line 157 or 159, and the corresponding voltage on a side of the coils 126 after the LPF 148, in accordance with embodiments of the present disclosure. The unfiltered pulses each have a pulse width that may be adjusted to generate the desired voltage level for the coil current $I_C$. For example, a series of high frequency voltage pulses $P_L$ on the line 157 or 159 from the H bridge 146 may each have a pulse width $W_L$, as shown in FIG. 7A. Over the course of a pulse or excitation period T, at which the coil current $I_C$ changes direction, the pulses $P_L$ have average voltage $V_L$. The LPF 148 filters the voltage pulses $P_L$ to produce a coil current pulse $P_{CL}$ of the coil current $I_C$ having the low DC voltage level $V_L$, as shown in FIG. 7B. Likewise, a series of high frequency voltage pulses $P_H$ from the H bridge 146 may each have a pulse width $W_H$, as shown in FIG. 7A. Over the course of the period T, the average voltage pulses $P_H$ have an average voltage $V_H$. The LPF 148 filters the voltage pulses $P_H$ to produce the voltage pulse $P_{CH}$ of the coil current $I_C$ having a high DC voltage level of $V_H$, as shown in FIG. 7B. Accordingly, the duty cycle at which the controller 140 actuates the switches 156 of the H bridge 146, can be varied by the controller 140 to not only control the direction the coil current pulses travel through the coils 126, but also the current profile of the coil current pulses.

Figure 8:
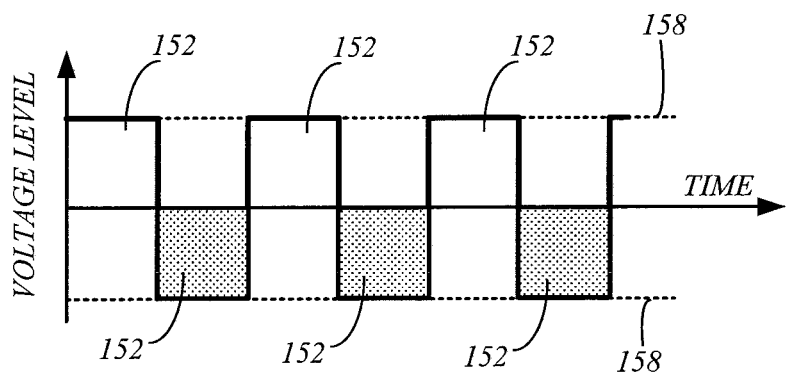
FIG. 8 is a chart of simplified current profiles of exemplary square coil current pulses.

FIG. 8 is a chart of simplified current profiles of exemplary square coil current pulses 152 that may be produced by the current generator 142. The controller 140 may control the duty cycle at which complementary pairs of switches 156 of the H bridge 146 are actuated to produce unfiltered current pulses that, when filtered using the LPF 148, produce the coil current pulses 152 having a voltage level 158 that may be set based on an operating setpoint of the flowmeter 102, for example. The controller 140 may also adjust the excitation frequency at which the pulses 152 change direction based on the duty cycle at which the complementary pairs of switches 156 are actuated. For example, positive current pulses 152 (unshaded) of the coil current $I_C$ may flow through the coils 126 in the direction indicated in FIGS. 2 and 3, and negative current pulses 152 (shaded) of the coil current $I_C$ may flow through the coils 126 in the direction indicated in FIG. 4. Additionally, the current profile of the pulses 152 may be controlled by the profile commands 145 from the profile generator 144. As discussed below, the current profile of the pulses 152 may include a time-varying voltage level.

The controller 140 may periodically receive current level measurements of the coil current $I_C$ from a current monitoring circuit 150 as feedback to determine if an adjustment to the coil current $I_C$ is required to match the setpoint level 158 (dashed lines in FIG. 8) for the magnetic flowmeter 102, which is necessary for accurate flow rate measurements. The current monitoring circuit 150 may take on any suitable form. For example, the current monitoring circuit 150 may operate to sense a voltage that is related to the coil current $I_C$ and convert the sampled voltage to a digital signal using an analog-to-digital converter that is presented to the controller 140 as a measured current level, for example. The controller 140 may adjust the coil current $I_C$ based on the measured current level in an attempt to match the current level of the coil current $I_C$ to the setpoint current level directed by the operating setpoint of the magnetic flowmeter 102. The voltage sampled by the circuit 150 over time may define the current profile of the coil current $I_C$ or the coil current pulses and may be used to form the current profile charts described herein.

It may be desirable to generate the current pulses 152 shown in FIG. 8 having square current profiles as the DC coil current $I_C$, by actuating the switches 156 of the H bridge 146 at a continuous duty cycle for the phases shown in FIGS. 5 and 6, based on a square profile command from the controller 140. However, due to the inductance of the coils 126, the measured current profile of the current pulses of the coil current $I_C$ that are driven through the coils 126 do not match an ideal square profile shown in FIG. 8.

Figure 9:
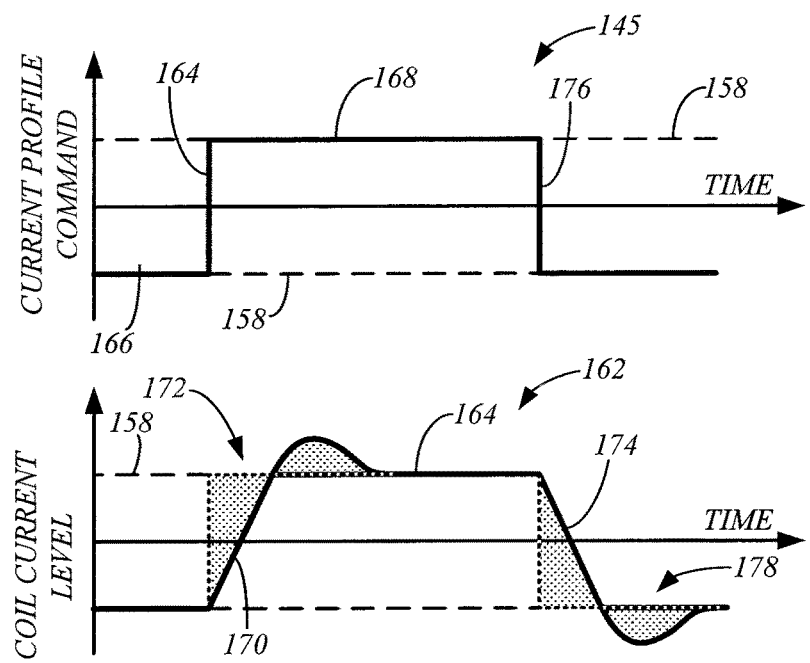
FIG. 9 includes a current profile chart of an exemplary square profile command, and a current profile chart of the resulting current profile of a coil current pulse that is generated based on the square profile command.

This is generally illustrated in FIG. 9, which includes a current profile chart of an exemplary square profile command 145 from the profile generator 144 and the resulting current profile 162 of a coil current pulse 164 that is generated based on the command 145 and driven through the coils 126 of the flow tube assembly 120. As shown in FIG. 9, a leading portion 164 of the command signal 145 substantially instantaneously transitions from a negative square current pulse profile 166, to a positive square current pulse profile 168. This causes the controller 140 to adjust the fixed duty cycles applied to the switches 156 to switch the voltage levels in the lines 157 and 159, and change the direction of the coil current $I_C$. For example, the command 145 may cause the controller 140 to transition from the duty cycles shown in FIG. 6 to the duty cycles shown in FIG. 5 to switch the direction of the coil current $I_C$ from the direction indicated in FIG. 4 to the direction indicated in FIG. 3.

Due to the inductance of the coils 126, it is not possible for the coil current $I_C$ to instantly make the direction change in accordance with the profile command 145. Instead, a leading portion 170 of the current pulse 162 has a level that gradually increases over time toward the setpoint level 158, and then overshoots the setpoint level 158. Thus, the leading portion 170 of the current profile of the current pulse 162 includes a leading error region 172 (shaded) corresponding to the difference from the leading portion 164 of the profile command 145. Likewise, a trailing portion 174 of the measured current profile of the current pulse 162 cannot match the corresponding trailing portion 176 of profile command 145, resulting in a trailing error region 178 (shaded) corresponding to the difference from the trailing portion 176 of the profile command 145.

This kind of overshoot can result from an integral part of proportional-integral-derivative (PID) control algorithms, which may be implemented by the controller 140. The integrator part of PID control algorithms make sure the current feedback tracks the profile command 145 exactly—or there is no error between the command profile 145 and the feedback from the monitoring circuit 150. However, when the feedback current falls behind the commanded current, the integrator tries to compensate for this error by creating another error in the opposite sign such that the "sum" of the error is zero. This phenomenon is well known by control engineers designing classical PID controllers.

However, when the controller 140 tries to compensate for the error caused by the fast commanded current profile, and a slow feedback response, it may need to apply a large voltage to bring the error to zero. If the required error-compensating voltage exceeds the maximum of the power supply 147 (e.g., when the pulse width modulated duty cycle is about 100 percent), the power supply 147 may become "saturated" such that it can't apply more voltage across the inductor anymore. In this case, the integrator part of the controller 140, after attempting to apply all of the power supply's voltage across the load (coil 126), is unable to bring the current under control and an error between the commanded current (profile command 145) and the feedback current gets larger and larger. This can result in instability of the controller 140 and ringing as the integrator portion of the PID controller 140 continues to try to bring the total accumulated error (between the command and feedback) back to zero by creating another error with "opposite sign."

The current level in the leading and trailing error regions 172 and 178 of the measured current profile of the current pulse 162 exceed the setpoint current level 158. This overshoot of the coil current level causes the magnetic field generated by the one or more coils 126 in response to the current pulse 162 to settle to the wrong field strength, which may result in inaccurate flow rate measurements. Additionally, the current level overshoot in the regions 172 and 178 may cause the power amplifier 142 to exceed its maximum voltage, which can saturate the power amplifier 142 and prevent proper regulation of the power amplifier 142.

Embodiments of the present disclosure operate to reduce the mismatch errors between the commanded current profile 145 and the measured current profile of the coil current $I_C$. This results in a reduction in current level overshoot and improved flow rate measurement accuracy. Additionally, the commanded current profiles may be configured to prevent the power amplifier 142 from exceeding its maximum voltage to avoid regulation issues.

Figure 10:
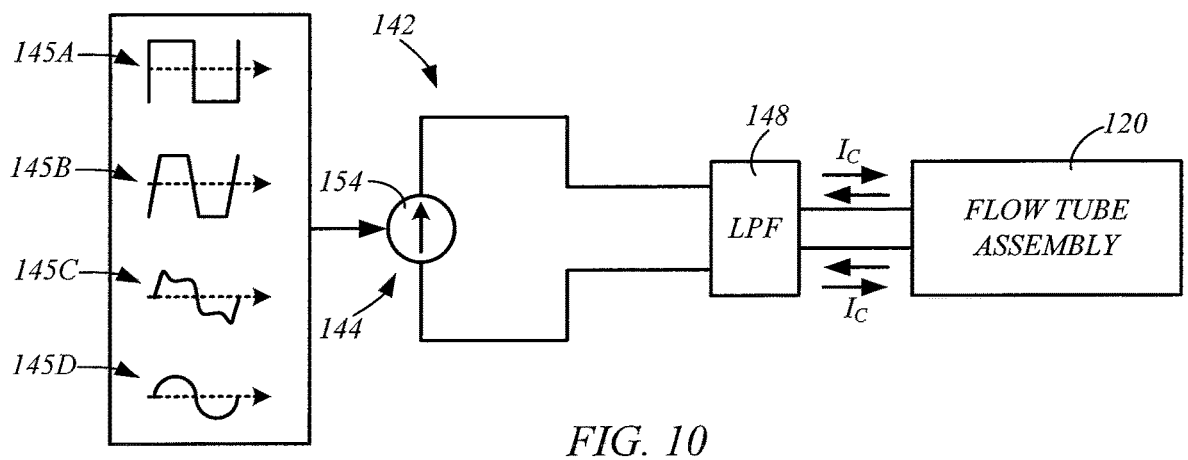
FIG. 10 is a simplified diagram of a current generator, a flow tube assembly, and exemplary profile commands, in accordance with embodiments of the present disclosure.

As mentioned above, the controller 140 controls the voltage level and current profile of the coil current pulses based on the profile commands 145 from the profile generator 144, as indicated in FIG. 2. The profile generator 144 operates to issue profile commands 145 to the controller 140 to control the current profile of the DC pulses of the coil current $I_C$, as indicated in the simplified diagram of FIG. 9, in which the power amplifier 142 is represented by a programmable bi-directional current source 154, which may be formed in accordance with the embodiments described above. In some embodiments, the profile generator 144 is configured to produce different complex profile commands 145, such as square current profile commands 145A, trapezoidal current profile commands 145B, irregular current profile commands 145C, sinusoidal current profile commands 145D, and/or other complex profile commands, as indicated in FIG. 10.

In some embodiments, the profile commands 145 are tailored to the inductance of the coils 126, such that the measured current profiles closely match the commanded profiles. The inductance of the coils 126 may be either empirically derived from family characteristics of a population of the magnetic flowmeters 102, or an empirically derived factory characterization of the magnetic flowmeter 102, for example. In some embodiments, the profile commands 145 are programmed as factory settings and stored in non-transitory, patent eligible memory of the magnetic flowmeter 102, such as memory represented by the controller 140 or the digital processor 130, for example.

Additionally, the profile commands may be tailored to the maximum voltage of the power amplifier 142, such as the power supply 147 (FIGS. 3 and 4), to reduce the likelihood of a current overshoot of the pulse current that exceeds the maximum voltage of the power amplifier 142. The profile generator 142 calculates a slope of a current level ramp that is practically achievable based on the estimated inductance of the coils 126 and, optionally, the maximum voltage of the power amplifier 142, and uses this slope to generate profile commands having a non-square current profile that can be substantially matched by the current pulses of the coil current $I_C$.

Figure 11:
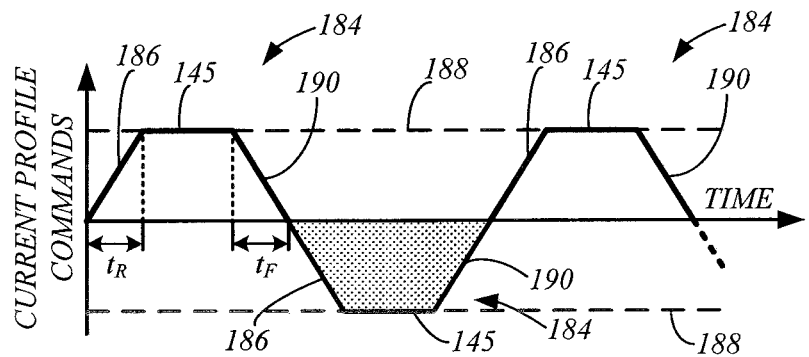
FIG. 11 is a chart illustrating current profiles of exemplary trapezoidal profile commands, in accordance with embodiments of the present disclosure.

FIG. 11 is a chart illustrating current profiles 184 of exemplary trapezoidal profile commands 145 that may be issued by the profile generator 144 to the power amplifier 142, in accordance with embodiments of the present disclosure. The current profiles 184 each have a leading portion 186, in which the current level gradually rises to the set point current level 188 over a rise time period $t_R$, and a trailing portion 190, in which the current level gradually returns to zero over a fall time period $t_F$. The slope of the leading and trailing portions 186 and 190 is determined by the profile generator 144 based upon the estimated inductance of the coils 126 and, optionally, the maximum voltage of the power amplifier 142.

Figure 12:
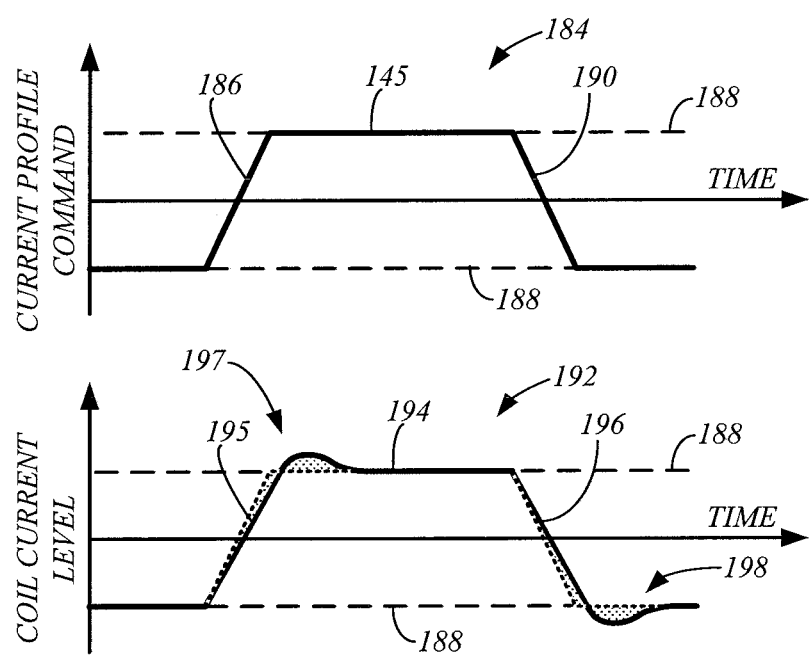
FIG. 12 illustrates a chart of a current profile of an exemplary trapezoidal profile command, and a chart of the current profile of the corresponding current pulse, in accordance with embodiments of the present disclosure.

FIG. 12 illustrates a chart of a current profile 184 of an exemplary trapezoidal profile command 145 from the profile generator 144, and a chart of the current profile 192 of the corresponding current pulse 194 generated by the power amplifier 142, which may be measured using the monitoring circuit 150, for example. Due to the slope of the leading and trailing portions 186 and 190 of the profile command 145 being tailored to the inductance of the coils 126, the measured current profile 192 includes leading and trailing portions 195 and 196 that closely match the leading and trailing portions 186 and 190 of the current profile 184 of the profile command 145, resulting in smaller leading error region 197 (shaded area) and trailing error region 198 (shaded area) relative to when square current profile commands 145 (FIG. 9) are used. As a result, the current pulses 194 of the coil current $I_C$ have a reduced current overshoot in the regions 197 and 198, thereby driving the magnetic field generated by the coils 126 to settle to the desired field strength indicated by the current level setpoint 188, and improving flow rate measurement accuracy.

Additionally, the profile commands 145 may be tailored to maintain the voltage of the power amplifier 142 below its maximum voltage when producing the current pulses 194 in response to the profile commands 145, including during the production of the current overshoot in the error regions 197 and 198. As a result, issues with the regulation of the power amplifier 142 can be reduced.

Figure 13:
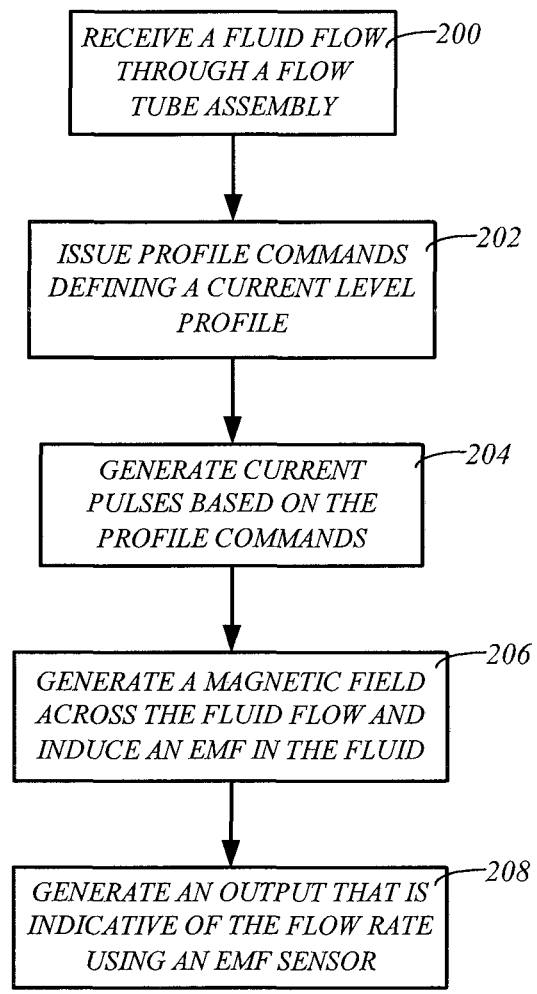
FIG. 13 is a flowchart illustrating a method of measuring a flow rate of a fluid flow, in accordance with embodiments of the present disclosure.

FIG. 13 is a flowchart illustrating a method of measuring a flow rate of a fluid flow using a magnetic flowmeter 102, in accordance with embodiments of the present disclosure. At 200 of the method, a fluid flow 104 is received through the flow tube assembly 120, such as through the pipe section 122, as shown in FIGS. 1 and 2. Profile commands 145 are issued at 202 that define a current profile 184 (FIGS. 9 and 10) of a voltage over time using the profile generator 144. In some embodiments, the profile commands 145 are based on an inductance of the coils 126. In some embodiments, the profile commands 145 are also based on a maximum voltage of the power amplifier 142.

At 204 of the method, current pulses are generated using the power amplifier 142 based on the profile commands 145, and are driven through the coils 126 of the flow tube assembly 120 in alternating directions. This may be accomplished in accordance with techniques described above, such as by actuating pairs of complementary switches 156 of an H bridge of the power amplifier 142 at different duty cycles, for example. In some embodiments, the current pulses each have a non-square current profile, such as indicated by the current pulse 194 shown in FIG. 12.

At 206, a magnetic field is generated across the fluid flow 104, and an EMF is induced in the fluid flow 104. The induced EMF is proportional to the flow rate of the fluid flow 104.

At 208, an output (e.g., differential voltage) that is indicative of the flow rate of the fluid flow 104 is generated using an EMF sensor 123 (FIG. 2) of the flow tube assembly 120. As discussed above, the output from the EMF sensor 123 may be processed by the signal processor 128 and digital processor 130, and communicated to an external computing device 112 using a communications interface 134, as shown in FIG. 2.

Although the embodiments of the present disclosure have been described with reference to preferred embodiments, workers skilled in the art will recognize that changes may be made in form and detail without departing from the spirit and scope of the present disclosure.

What is claimed is:

1. A magnetic flowmeter for measuring a flow rate of a fluid flow, comprising:
   a flow tube assembly configured to receive the fluid flow and including:
      a coil configured to produce a magnetic field across the fluid flow in response to a coil current, the magnetic field induces an electromotive force (EMF) in the fluid flow that is proportional to the flow rate; and
      an EMF sensor arranged to sense the EMF and generate an output indicating the induced EMF; and
   a programmable bi-directional current generator comprising:
      a profile generator configured to issue at least one of a plurality of different profile commands;
      a power amplifier; and
      a controller to control the power amplifier to generate coil current pulses forming the coil current that travel through the coil in alternating directions, each coil current pulse having a current profile of voltage over time that is based on the at least one of a plurality of different profile commands from the profile generator.

2. The magnetic flowmeter of claim 1, wherein:
the power amplifier comprises:
a power supply;
an H bridge coupled to the power supply; and
a low pass filter configured to receive unfiltered current pulses from the H bridge through first and second conductors, attenuate high frequency components of the unfiltered current pulses to form the coil current pulses; and
the controller is configured to actuate pairs of complementary switches of the H bridge at varying duty cycles to generate the unfiltered current pulses based on the profile commands and alternate the direction of the coil current pulses through the coil.

3. The magnetic flowmeter of claim 2, wherein the unfiltered current pulses have a frequency of 10-100 kHz.

4. The magnetic flowmeter of claim 2, wherein the H bridge includes:
a first switch configured to actuate coupling the first conductor and a first terminal of the power supply;
a second switch that is complementary to the first switch and is configured to actuate coupling the first conductor to a second terminal of the power supply;
a third switch configured to actuate coupling of the second conductor to the first terminal of the power supply; and
a fourth switch that is complementary to the third switch and is configured to actuate coupling the second conductor to the second terminal of the power supply.

5. The magnetic flowmeter of claim 4, wherein:
the controller actuates the first and second switches at a higher duty cycle than the third and fourth switches to deliver the coil current pulses in a first direction through the coil; and
the controller actuates the third and fourth switches at a higher duty cycle than the first and second switches to deliver the coil current pulses in a second direction, which is opposite the first direction, through the coil.

6. The magnetic flowmeter of claim 4, wherein:
the controller actuates the first and second switches at a first duty cycle to produce first unfiltered current pulses having a first average voltage on the first conductor based on the profile commands;
the controller actuates the third and fourth switches at a second duty cycle to produce second unfiltered current pulses having a second average voltage on the second conductor based on the profile commands; and
a difference between the first and second average voltages determines the direction coil current pulses travel through the coil.

7. The magnetic flowmeter of claim 4, wherein each of the coil current pulses travels in a single direction through the coil and has a current profile of a voltage level that varies with time in accordance with the corresponding profile command.

8. The magnetic flowmeter of claim 7, wherein:
the controller actuates the first and second switches at a first duty cycle that varies over time to produce first unfiltered current pulses having a first average voltage level at the first conductor that varies over time based on the profile commands; or
the controller actuates the third and fourth switches at a second duty cycle that varies over time to produce second unfiltered current pulses having a second average voltage at the second conductor that varies over time based on the profile commands.

9. The magnetic flowmeter of claim 1, wherein the profile commands include commands to produce the coil current pulses, each coil current pulse having a current profile of a voltage over time selected from the group consisting of a square current profile, a non-square current profile, a trapezoidal current profile, a sinusoidal current profile, and an irregular current profile.

10. The magnetic flowmeter of claim 9, wherein each profile command corresponds to a non-square current profile having a leading portion, in which the voltage level gradually rises to a set point level over time.

11. The magnetic flowmeter of claim 10, wherein the non-square current profile includes a trailing portion, in which the current level gradually falls from the set point level over time.

12. The magnetic flowmeter of claim 9, wherein:
the EMF sensor comprises first and second electrodes positioned on opposing sides of the fluid flow; and
the magnetic flowmeter includes:
a signal processor configured to receive voltages sensed by the first and second electrodes and generate a digital voltage signal indicating a voltage difference between the first and second electrodes that is proportional to the EMF and the flow rate of the fluid flow; and
a digital processor configured to process the digital voltage signal and establish a flow rate of the fluid flow.

13. The magnetic flowmeter of claim 12, including a communications interface configured to communicate the flow rate to an external computing device over a two-wire process control loop that powers the magnetic flowmeter.

14. The magnetic flowmeter of claim 1, wherein the profile commands are based on an inductance of the coil.

15. The magnetic flowmeter of claim 1, wherein the profile commands are based on a maximum voltage of a power supply of the power amplifier.

16. The magnetic flowmeter of claim 1 wherein a profile command is selected from the plurality of different profile commands to reduce errors in the coil current that travels through the coil.

17. A method of measuring a flow rate of a fluid flow comprising:
receiving the fluid flow through a flow tube assembly having a coil;
issuing at least one of a plurality of different profile commands defining a current profile of a voltage over time using a profile generator;
generating coil current pulses of a coil current using a programmable bi-directional current generator, each coil current pulse having a current profile of a voltage over time that is based on the at least one of the plurality of different profile commands, wherein the coil current pulses are driven through the coil in alternating directions;
generating a magnetic field across the fluid flow using the coil that induces an electromotive force (EMF) in the fluid flow that is proportional to the flow rate in response to generating the coil current pulses; and
generating an output indicating the induced EMF using an EMF sensor.

18. The method of claim 17, wherein generating the coil current pulses comprises:

actuating pairs of complementary switches of an H bridge at different duty cycles to generate unfiltered current pulses based on the profile commands and alternate the direction the coil current pulses travel through the coil; and filtering the unfiltered current pulses using a low pass filter to form the coil current pulses.

19. The method of claim 18, wherein the unfiltered current pulses have a frequency of 10-100 kHz.

20. The method of claim 18, wherein:

the H bridge comprises:

a first switch configured to actuate coupling the first conductor and a first terminal of the power supply;

a second switch that is complementary to the first switch and is configured to actuate coupling the first conductor to a second terminal of the power supply;

a third switch configured to actuate coupling of the second conductor to the first terminal of the power supply; and a fourth switch that is complementary to the third switch and is configured to actuate coupling the second conductor to the second terminal of the power supply; and actuating pairs of the complementary switches comprises:

actuating the first and second switches at a first duty cycle to produce first unfiltered current pulses having a first average voltage on the first conductor based on the profile commands using the controller; and actuating the third and fourth switches at a second duty cycle to produce second unfiltered current pulses having a second average voltage on the second conductor based on the profile commands using the controller;

a difference between the first and second average voltages determines the direction the coil current pulses travel through the coil.

21. The method of claim 18, wherein:

actuating the pairs of complementary switches of an H bridge at different duty cycles comprises actuating the pairs of complementary switches at different duty cycles that vary over time based on the profile commands; and the coil current pulses each have a current profile of a varying voltage over time.

22. The method of claim 18, including:

processing the output from the EMF sensor using a signal processor; and processing a digital output signal from the signal processor using a digital processor to establish the flow rate of the fluid flow; and communicating the flow rate to an external computing device using a communications interface.

23. The method of claim 17, wherein the profile commands include commands to produce the coil current pulses, each coil current pulse having a current profile of a voltage over time selected from the group consisting of a square current profile, a non-square current profile, a trapezoidal current profile, a sinusoidal current profile, and an irregular current profile.

24. The method of claim 17, wherein the profile commands are based on an inductance of the coil.

25. The method of claim 17, wherein the profile commands are based on a maximum voltage of a power supply of the current generator.

26. The method of claim 17 wherein the at least one of the plurality of different profile commands is selected to reduce errors in the current profile through the coil.

* * * * *